May 1, 1962 D. M. COULSON ETAL 3,032,493
ELECTROLYTIC TITRATION APPARATUS
Filed Dec. 31, 1959 3 Sheets-Sheet 2
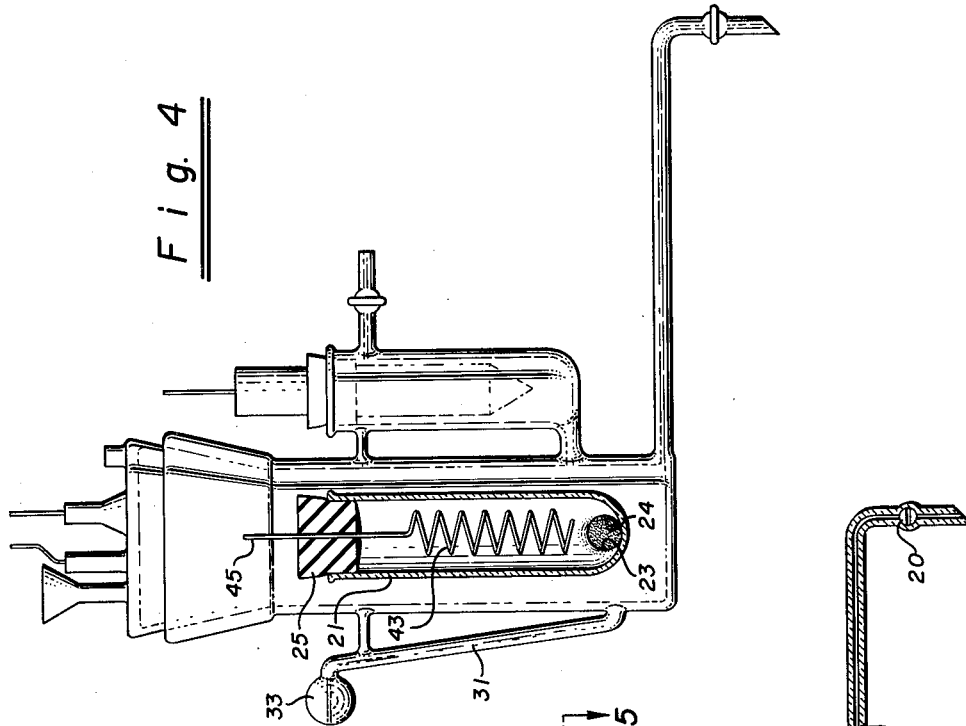
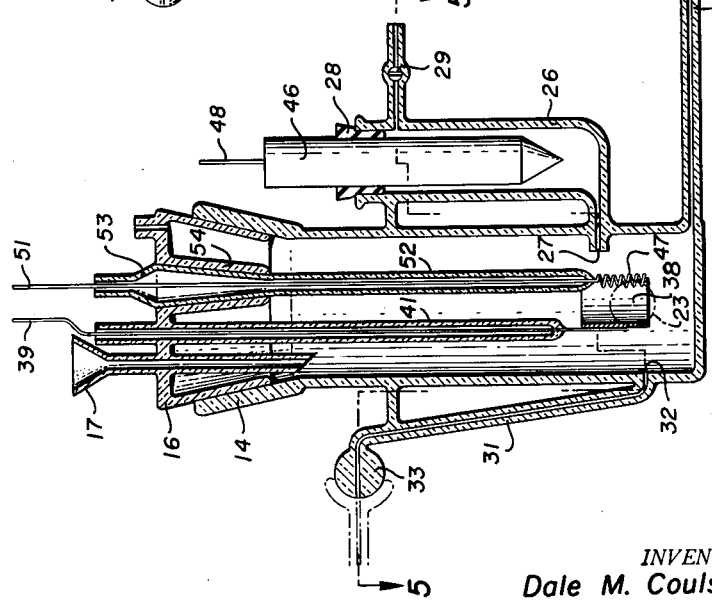
INVENTOR.
Dale M. Coulson
BY Leonard A. Cavanagh
Attorneys INVENTOR.
Dale M. Coulson
BY Leonard A. Cavanagh
Attorneys United States Patent Office 3,032,493
Patented May 1, 1962

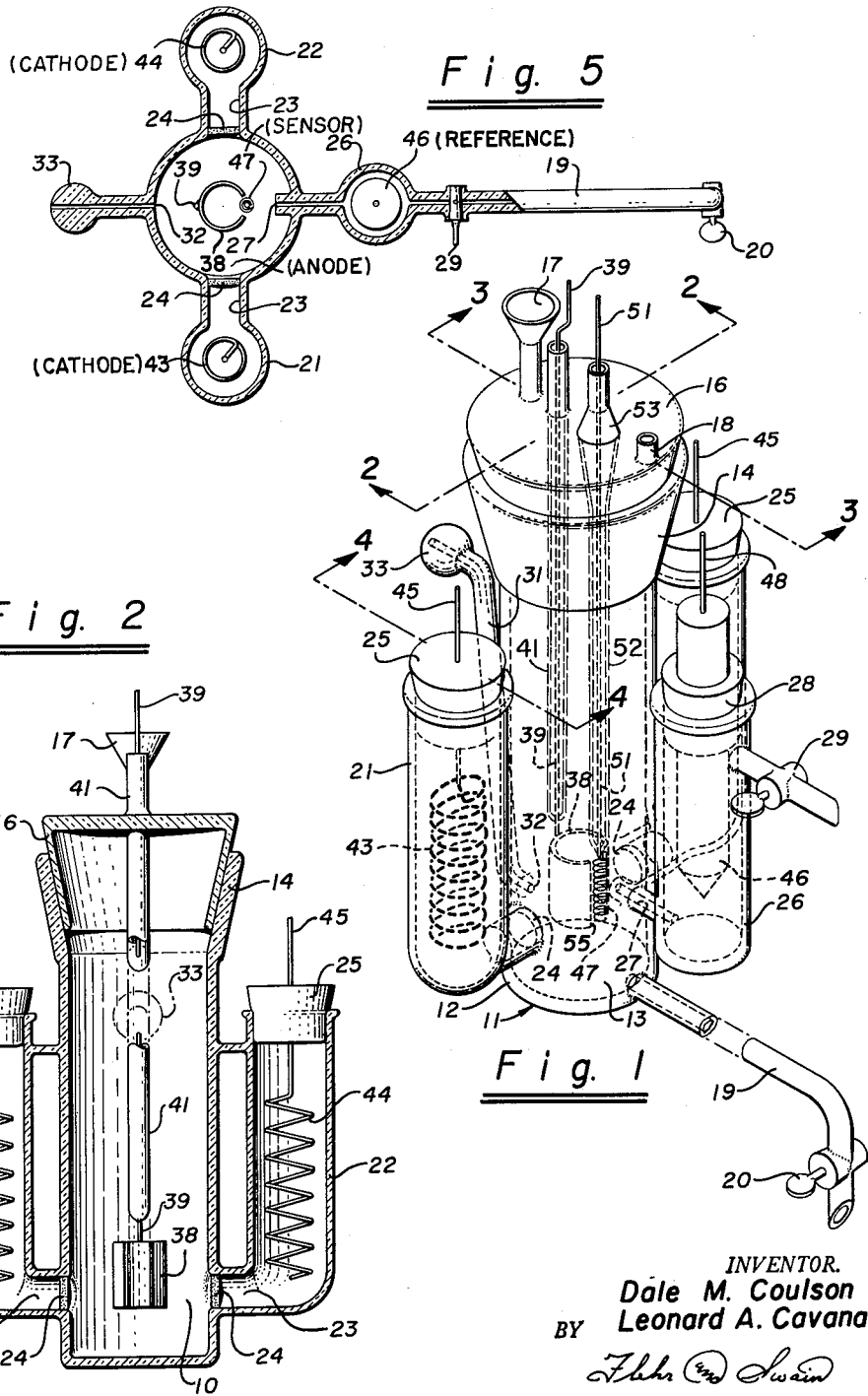

3,032,493
ELECTROLYTIC TITRATION APPARATUS
Dale M. Coulson, Palo Alto, and Leonard A. Cavanagh, San Jose, Calif., assignors to Dohrmann Instruments Company, San Francisco, Calif., a corporation of California
Filed Dec. 31, 1959, Ser. No. 863,162
15 Claims. (Cl. 204—195)

This invention relates to an electrolytic titration apparatus and more particularly to a coulometric titration cell for use in such apparatus.

At the present time, there is a great need for an electrolytic titration apparatus which can be utilized for microanalysis. Similar devices now on the market are not adapted for measurement of such small quantities. In addition, such devices are generally adapted for specific purposes and are not readily adaptable for general purpose use. Up to the present time, great difficulty has been encountered when attempting to measure very micro quantities in an electrolytic titration apparatus because the current flowing through the electrolyte between the generator electrodes has resulted in an IR drop through the electrolyte. This creates a potential field in the electrolyte which interferes with the operation of the sensing electrodes. There is, therefore, a great need for electrolytic titration apparatus suitable for general purpose quantitative analysis on a micro and a macro scale.

In general, it is an object of the present invention to provide electrolytic titration apparatus of a general type which can be utilized for micro and macro analysis.

Another object of the invention is to provide a titration apparatus of the above character which may be used for batch operation or continuous operation.

Another object of the invention is to provide a titration appratus of the above character in which the IR drop resulting from the generator electrode system has little, or no effect on the measurement of the potential of the sensing electrode system.

Another object of the invention is to provide a titration apparatus of the above character in which the generator electrode system may be electrically isolated from the sensor electrode system.

Another object of the invention is to provide a titration apparatus of the above character in which an anticipatory system may be utilized between the generator electrode system and the sensor electrode system to prevent hunting due to over-titration.

Another object of the invention is to provide an electrolytic titration apparatus of the above character which can be utilized for making determinations from direct or indirect reactions accomplished either through oxidation or reduction in an electrolyte.

Additional objects and features of the invention will appear from the following description in which the preferred embodiment is set forth in detail in conjunction with the accompanying drawings.

Referring to the drawings:

FIGURE 1 is a perspective view of a titration cell utilized in our electrolytic titration apparatus.

FIGURE 2 is a cross-sectional view taken along the line 2—2 of FIGURE 1.

FIGURE 3 is a cross-sectional view taken along the line 3—3 of FIGURE 1.

FIGURE 4 is a cross-sectional view taken along the line 4—4 of FIGURE 1.

FIGURE 5 is a cross-sectional view in plan of our electrolytic titration apparatus.

Figure 6:
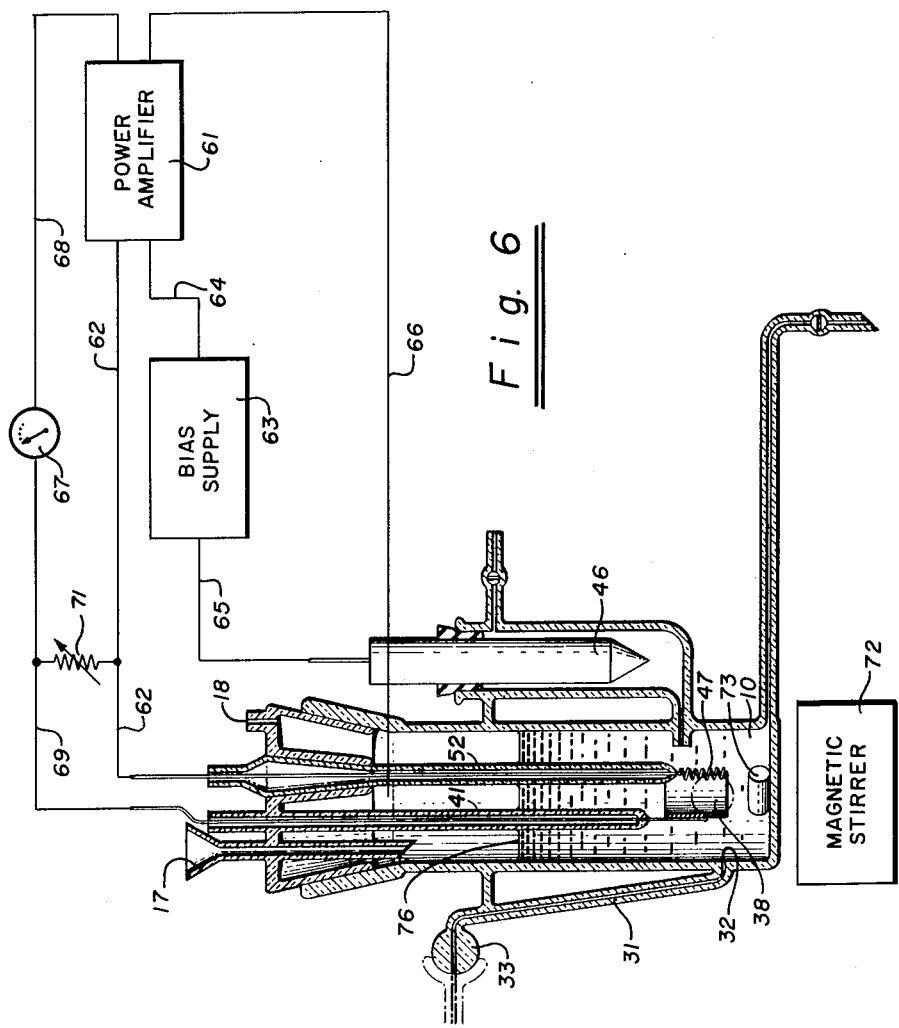
FIGURE 6 is a view of the titration cell and the associated circuitry in schematic form.

In general, our titration apparatus consists of an electrolytic cell which includes a central reaction zone containing an electrolyte and means for introducing the fluid containing the constituent to be measured into the electrolyte. Current generating means including at least two electrodes, one of which is a cathode and one of which is an anode is provided. One of the electrodes is immersed in the electrolyte, whereas the other of the electrodes is isolated from the first named electrode to prevent the mixing of the electrolyte about the two generating electrodes. A sensing electrode and a reference electrode disposed in the electrolyte are arranged in a line at substantially right angles to the line between the generating electrodes.

More particularly, the electrolytic cell utilized in our electrolytic titration apparatus, as shown in FIGURES 1–5, includes means containing an electrolyte and defining a reaction zone 10 for carrying out the titration process. This means is shown in the form of a substantially cylindrical vessel or cell 11, but if desired may be of any size and shape. As shown in the drawing, the vessel is a glass cylinder 12 having a flat bottom wall 13 so that it is particularly adapted for use with a magnetic stirrer. The smooth surface of the bottom wall 13 permits the above magnet utilized in such a magnetic stirrer to spin freely while in the rotating field of the magnetic stirrer. The cell 11 is provided with an outwardly tapered upper portion 14 which has its inner surface ground to provide a female ground joint. A cap 16 is mounted in the flared portion 14 of the cell and is provided with an inwardly tapered side wall which is ground to provide a male ground joint adapted to cooperate with the female ground joint provided on the flared portion 14. This joint provides supports for the cap 16. The cap is provided with a funnel 17 and a vent 18 for a purpose hereinafter described. The vessel 11 is provided with a drain tube 19 which is provided with a stopcock 20 to facilitate removal of electrolyte from the reaction vessel 11.

A pair of diametrically opposed side arms 21 and 22 is mounted on the side walls of the vessel in the form of glass cylindrical members which have their lower ends connected to the lower portion of the vessel 11 by tubes 23 as shown particularly in FIGURE 2 of the drawing. Mixing of electrolyte between the side arms is restricted or inhibited by suitable means such as coarse glass fritted discs 24 disposed in each of the arms. The upper open ends of the side arms 21 and 22 are closed with suitable means such as corks 25. The vessel cell 11 is also provided with an additional side arm 26. It is mounted on the side wall of the vessel by a small tube 27. The side arm 26 is also shown in the form of a glass cylinder and has its open end closed by a cork 28. A stopcock 29 is mounted on the side arm 26 and can be used for venting purposes as hereinafter described.

Means is provided for introducing the constituent into the electrolyte or into the reaction zone and consists of a capillary entry tube 31 connected to the side wall of the vessel 11 so that it serves as a pin hole bubbler at point 32. The upper end of the capillary tube is provided with a ball joint 33 for connection to associated apparatus as hereinafter described.

The titration cell also includes a generator electrode assembly and a sensing electrode assembly. The generator electrode assembly can consist of a plurality of electrodes, with at least one being an anode and at least one being a cathode. In the embodment shown in the drawings, only one of the electrodes, the anode 38, has been mounted within the reaction zone of the vessel 11. The anode 38 may be formed of any suitable material such as platinum. It may be in a suitable form such as a cylinder which is supported by a lead 39 mounted in a tube 41 that is a part of cap 16. Rotation of the cap 16 shifts the position of the anode 38 with respect to the cathodes, which are in fixed position as will hereinafter be described. In the embodiment shown, a pair of cathodes 43 and 44 of suitable material such as platinum in a suitable form such as a spiral is provided. They are disposed within the side arms 21 and 22 and are secured to two leads 45 which extend through the stoppers or corks 25 and which serve to support the cathodes within the arms. As explained previously, the arms 21 and 22 are diametrically opposed and since the anode 38 is centrally disposed within the reaction chamber of the vessel 11, the two cathodes and the anode are in substantial alignment.

The sensing or indicating electrode assembly consists of a reference electrode 46 and a sensing electrode 47. The reference electrode is of a conventional type such as a calomel cell. It is disposed within the arm 26 and is supported by the stopper 28. It is connected to a lead 48. Electrolytic contact with the electrolyte in reaction zone 10 is made through the small tube 27 which acts as a salt bridge. The sensing electrode is in the form of a small spiral of wire coated with suitable material such as silver or antimony or may be a glass electrode or any other electrode which is sensitive to a change in composition of the solution. It is carried by a lead 51 supported by a glass tube 52. The upper portion of the tube 52 is provided with a male ground joint 53 which is adapted to cooperate with a female ground joint 54 provided in the cap 16. This permits ready removal of the sensing electrode 47 without removal of the cap to facilitate replacement of the sensing electrode or to substitute a different sensing electrode. The ground joint also facilitates movement of the sensing electrode to achieve optimum performance. Under certain conditions, it may be advisable to use a glass electrode as the sensing electrode. As will be noted from the drawings, the sensing electrode 47 is disposed within a narrow slot 55 cut into the cylindrical anode 38 so that the center of the sensing electrode 47 is radially spaced the same distance as the side wall forming the cylindrical anode 38.

The associated circuitry for use with the titration cell, as shown in FIGURES 1–5, is shown schematically in FIGURE 6. It consists of a high gain amplifier 61 which has its input connected to the sensing electrode 47 by conductor 62 and to a bias supply 63 by a conductor 64, respectively. The input to the bias supply 63 is connected to the reference electrode 46 by a conductor 65 and serves to bias the indicator electrode 47 to a voltage null with respect to the reference half cell 46. The bias potential is calculated in a manner hereinafter described and is set for this calculated value.

One side of the output of the amplifier 61 is connected to the cathodes 43 and 44 of the generating electrodes by a conductor 66. The other side of the output of the amplifier is connected to one side of a suitable measuring instrument such as a microcoulometer or microammeter 67 by a conductor 68. The other side of the instrument 67 is connected to the anode 38 by a conductor 69. A variable feedback resistance 71 is connected between the conductors 69 and 62 and establishes an external connection between the generating anode 38 and the sensing anode 49 to serve as a dampening adjustment as hereinafter described. Also provided is a magnetic stirrer 72 which drives a magnet 73 located in the bottom of the vessel 11.

Operation of the titration apparatus may now be briefly described as follows: Let it be assumed that the vessel cell 11 is filled with an electrolyte through the funnel 17 to a suitable level such as the level 76 as shown in FIGURE 6. Electrolyte is allowed to pass into the side arm 26 by opening the stopcock 29. Electrolyte is also placed in the side arms 21 and 22. The side arms normally contain the same electrolyte as within the central zone 10; however, if desired, another electrolyte may be utilized in the side arms. The bias is calculated and set so that a null condition is established between the sensing electrode and the reference electrode.

Now let it be assumed that the fluid stream containing the sample to be titrated is passed through the ball joint 33 through the entrance tube 31 and out the capillary opening 32 where it is bubbled into the electrolyte within the reaction zone 10. In the case of a gas stream, excess inert gas similar to the sample carrier may be added to the main gas stream to ensure rapid and complete introduction of the sample into the cell. This higher rate of flow reduces the possibility of the electrolyte or the solution in the reaction chamber from backing up into the sample entry tube. Also, in this manner, sample hold-up on the wetted surface of the entry tube 31 is substantially reduced if not prevented.

As the sample enters the reaction chamber, it goes into the solution to produce a change in the potential between the sensing electrode 47 and the reference electrode 46. The manner in which a sample goes into the solution need not be known. It may be by reaction or hydration, or a combination of both. It makes no difference as far as the analysis is concerned. Thus, the sensing electrode observes changes in potential resulting from changes in the rate of addition of the sample into the electrolyte. This change of potential causes the sensing electrode to produce a signal which is applied through the conductor 62 to the input of the amplifier 61 and causes the amplifier 61 to change its generating current to generate a reactant. As is well known to those skilled in the art, the amount of reactant generated is directly proportional to the generation of current from the amplifier. In operation, the concentration of the material being titrated is held nearly constant by adding the internally generated titrating agent continuously at a rate equivalent to the rate of the sample introduction. When all the sample has been reacted with titrating agent created by the generating current, the system reaches a null condition when a zero signal appears at the indicating electrodes and no titrating agent is being generated.

If an excess of titrating agent is generated, the polarity of the signal at the indicating or sensing electrode 47 is reversed to cause the current flow in the opposite direction from the output of the amplifier and to reverse the normal electrolytic action until the excess of titrating agent has been removed.

The resistor 71 makes it possible to eliminate or reduce hunting by applying a variable signal from the titrant generating electrode to the sensing electrode. A portion of the output of the amplifier 61 is applied by the resistance 71 to the sensing electrode 47 so that the sensing electrode can anticipate when sufficient titrating agent has been generated. The resistance 71, therefore, provides an effect similar to degenerative feedback from the generating electrodes to the sensing electrode. It will be understood that the value of the resistance required to prevent hunting will vary in accordance with the particular system used, but can be readily determined by one skilled in the art.

Any method of introducing degenerative feedback from the generating electrode to the sensing electrode may be utilized as a damping control. The variable resistance 71 externally connected between the generating electrode and the sensing electrode serves as a damping adjustment. As is well known to those skilled in the art, increasing the degenerative feedback decreases the tendency to overshoot as a result of rapid signal changes.

It has been found that an electrolytic cell constructed in the foregoing manner is particularly sensitive and is readily usable for micro or macro analysis. The sensing electrode and the reference electrode have been so arranged that a line passing through them is at right angles to a line passing through the generating electrodes and to the current flow between the generating electrodes. Because of this special configuration of the electrodes, the IR drop resulting from the operation of the generator electrode system has little or no effect on the measurement of potential by the sensing electrode. Thus, during the titrant generation, the IR drop between the generating electrodes does not add to or subtract from the signal from the indicator electrode. In other words, the position of the sensing electrode in the electrolyte and the position of the electrolytic contact of the reference electrode with the electrolyte in the reaction zone are in areas of substantially equal potential in the IR-drop field resulting from the current flow between the generating electrodes. It will be apparent that the particular arrangement illustrated is merely one means of accomplishing this result. This makes possible a very high signal to noise ratio for the sensing electrode so that it becomes practical to make micro-determinations using coulometric techniques.

Also adding to the overall accuracy of the apparatus has been the placement of the sensing electrode 47. By placing the sensing electrode 47 in the same plane as the anode 38 and in relatively close proximity to the anode 38, it is possible for the sensing electrode 47 to sense immediately any change in the ion flow from the anode 38. This is particularly advantageous in that it helps to prevent overshoot.

With the exception of the high resistance 71 connecting the sensing electrode system to the generating electrode system, the two systems are completely isolated electrically one from the other. This also adds to the accuracy of the apparatus.

Diffusion of electrolyte between the central reaction zone 10 and the side arms 21 and 22 is restricted by the fritted discs hereinbefore described, and side arm 26 by the capillary tube 27. The cathodes contained in the side arms 21 and 22 and the reference half cell 46 contained in the side arm 26 are in electrical and physical contact with the electrolyte in the central reaction zone 10 because of the salt bridges formed so that the electrolytic cell functions in its normal manner. However, by providing this restricted flow of the electrolyte, plating of the cathodes and polarization of the reference cell is inhibited.

By way of example, one use of our apparatus for making a micro-determination is set forth below. An examination was made of organic chloride-containing materials. The chloride ion was titrated with a silver ion. For that reason, the anode 38 was formed of platinum plated with silver and the cathodes 43 and 44 were formed of platinum. The sensing electrode 47 was also formed of silver and a saturated calomel electrode was used as the reference electrode 46.

The theoretical desired bias potential to be supplied by the bias supply 64 was calculated as follows. Since the electrode potentials in aqueous solutions were well known, it was possible to calculate the electrode potential at the ideal silver ion concentration. The electrode reaction is $$Ag_{metal} \rightarrow Ag^+ + e^- \qquad (1)$$

The standard potential is —0.799 volts with reference to a normal hydrogen electrode. The potential of a silver wire in an acid solution at 25° C. containing silver ions is given by the equation:

$$E = E^0 - .059 \log (AG^+) \qquad (2)$$

where $E^0$ is —0.799 volts and $(Ag^+)$ is the silver ion concentration in moles per liter.

In the titration of chloride ions by silver ions, a precipitate of silver chloride is formed. The solubility of chloride in a solution containing silver ions is given by:

$$(Ag^+)(Cl^-) = 10^{-10} \frac{(moles)^2}{(liter)^2} \qquad (3)$$

From theoretical considerations of Equations 2 and 3, the most sensitive condition (that is, the electrode potential changes most rapidly for small changes in the amount of silver or chloride in the solution) is where the silver ion concentration is exactly equal to the chloride ion concentration, namely, $10^{-5}$ moles per liter. Thus, $$E_{Ag} = -0.799 - .059 \log 10^{-5}$$
$$= -0.799 + .059 \times 5$$
$$= -0.799 + .295$$
$$= -0.504 \text{ v. (with reference to the normal hydrogen electrode)}$$

The potential of the reference electrode (a saturated calomel electrode) is —0.246 volt with respect to a normal hydrogen electrode. The desired bias potential, that is, the potential necessary to equal the potential of the cell formed by the silver electrode and the saturated calomel reference electrode is:

$$-0.504 + 0.246 = 0.258 \text{ volt} \qquad (4)$$

for pure aqueous solutions. In practice, this value has been found to provide a satisfactory bias for our electrolytic apparatus. In the present example, an acetic acid solution comprised of glacial acetic acid with 10–20% water was used. For this reason, the above theoretical value would not be exactly correct. However, since the correct value is very near this theoretical value, it has been found that this theoretical bias value performs satisfactorily in an acetic acid solution. If desired, a more accurate calculation of the desired bias could be made. However, to make such a calculation, it would be necessary to know the electrode potential of the silver electrode in an acetic acid solution and also the solubility of silver chloride in the same solution.

After calculation of the bias and setting of the bias supply 64 to the calculated value to obtain a null condition between the sensing electrode and the reference electrode, the chlorides were introduced into the coulometric titration cell through the entrance tube 31. This was performed by first converting the organic chloride to HCl in a combustion furnace. The effluent gases from the combustion tube of the furnace were introduced into the coulometric cell through the joint 33. The HCl was bubbled into the glacial acetic acid through the capillary opening 32. As the chloride goes into the solution, chloride ions are generated which react very rapidly with the silver ions to form a precipitate of silver chloride. This reduces the concentration of the silver ions in the electrolyte and changes the tendency of silver ions to come off the sensing electrode 47. This changes the potential on the sensing electrode and causes a signal voltage to be generated. The signal voltage drives the amplifier 61 which, in turn, causes the anode 38 to become more positive. This causes more electrons to be pulled out of the anode 38 which allows more silver ions to escape into the electrolyte to restore the silver ions which have been removed by the precipitation and to thereby restore the balanced condition present in the electrolyte before introduction of the chlorides.

With such apparatus, it has been found that amounts of chlorine in a sample as small as $8.8 \times 10^{-4}$ micrograms can be detected. As can be appreciated by those skilled in the art, this is a sensitivity which greatly exceeds that possible with the presently known apparatus.

It is readily apparent from the foregoing that the electrolytic titration apparatus hereinbefore described is very versatile and can be used to titrate any constituent in a gas or liquid stream which can be titrated coulometrically either directly or indirectly. It has many general applications for determination of a great many constituents by merely changing the electrode materials and the electrolyte. For example, if the generation anode is composed of copper, sulphide may be determined without chloride interference with a copper microelectrode for an indicating anode. Carbon dioxide may be determined using a barium chloride electrolyte with an antimony or glass sensing electrode. However, the polarity of the generating electrode must be reversed at the amplifier. Thus, the cell can be used for an acid-base titration. If, for example, a lead anode is used with a lead sensor electrode, the sulfate ion can be determined coulometrically. Iodine can be coulometrically generated in a depleted Karl Fisher reagent. Olefins can be titrated with coulometrically generated bromine.

It is also apparent that our electrolytic titration apparatus makes possible more rapid titrations with greatly increased accuracy. It has much greater sensitivity with a low noise level and with a minimum of overshoot.

We claim:

1. In an electrolytic titration apparatus, an electrolytic cell comprising means containing an electrolyte forming a reaction zone, means for introducing a fluid containing the constituent to be titrated into the electrolyte, generating electrodes disposed in the electrolyte to cause direct current to flow in the electrolyte and thereby cause the generation of a titrant, one of said electrodes being an anode and the other of said electrodes being a cathode, a sensing electrode disposed in said electrolyte and a reference electrode making electrolytic contact with said electrolyte, the position of said sensing electrode in the electrolyte and the position at which said reference electrode makes electrolytic contact with said electrolyte being in areas of approximately equal potential in the IR-drop field resulting from current flow between said generating electrodes.

2. Electrolytic titration apparatus as in claim 1 wherein said sensing electrode is disposed in relatively close proximity to the titrant generating electrode so that the sensing electrode is positioned in the electrolyte at a point where changes occur in the electrolyte more rapidly than they take place in the main body of the electrolyte.

3. Electrolytic titration apparatus as in claim 1 together with means to permit shifting of the position of one of the generating electrodes with respect to the other generating electrode.

4. Electrolytic titration apparatus as in claim 1 together with means to permit shifting of the sensing electrode with respect to the reference electrode and with respect to the generating anode.

5. In an electrolytic titration apparatus, an electrolytic cell comprising means containing an electrolyte forming a reaction zone, means for introducing a fluid containing the constituent to be titrated into the electrolyte, generating electrodes disposed in the electrolyte to cause direct current to flow in the electrolyte and thereby cause the generation of a titrant, one of said electrodes being an anode and the other of said electrodes being a cathode, a sensing electrode disposed in said electrolyte and a reference electrode making electrolytic contact with said electrolyte, the position of said sensing electrode in the electrolyte and the position at which said reference electrode makes electrolytic contact with said electrolyte being in areas of approximately equal potential in the IR-drop field resulting from current flow between said generating electrodes, and circuitry associated with said electrodes to provide automatic generation of a titrant in the electrolyte in accordance with the rate of introduction of the constituent into the electrolyte.

6. Electrolytic titration apparatus as in claim 5 including circuit means for applying a signal from the titrant generating electrode to the sensing electrode to thereby prevent hunting as a result of over-titration.

7. In an electrolytic titration apparatus, an electrolytic cell comprising a vessel containing electrolyte and forming a reaction zone, means for introducing a fluid containing a constituent into the electrolyte, generating electrodes, said generating electrodes consisting of an anode disposed in the electrolyte in the vessel, a side arm containing electrolyte, a salt bridge connecting the electrolyte in the side arm to the electrolyte in the vessel, said generating electrodes also consisting of a cathode disposed in the electrolyte in the side arm, a reference electrode and a sensing electrode, said sensing electrode being disposed in said electrolyte in relatively close proximity to the generating anode, said reference electrode making electrolytic contact with said electrolyte, the position of said sensing electrode in the electrolyte and the position at which said reference electrode makes electrolytic contact with said electrolyte being in areas of approximately equal potential in the IR-drop field resulting from current flow between said generating electrodes, and circuitry connecting the generating electrodes and the sensing and reference electrodes to cause automatic generation of a titrant in accordance with the rate of introduction of the constituent into the electrolyte.

8. Electrolytic titration apparatus as in claim 7 wherein said circuitry includes means connecting the sensing electrode system to the generating electrode system for applying a signal to the sensing electrode to thereby prevent hunting as a result of over-titration.

9. Electrolytic titration apparatus as in claim 7 together with an additional side arm containing an electrolyte, and a salt bridge connecting the electrolyte in the additional side arm to the electrolyte in the vessel, and wherein said reference electrode is disposed in the electrolyte in said additional side arm.

10. Electrolytic titration apparatus as in claim 7 wherein said generating anode is substantially in the form of a cylinder, said cylinder having a slot therein and wherein said sensing electrode is positioned in the slot provided in said cylinder.

11. Electrolytic titration apparatus as in claim 7 wherein said means for introducing the fluid containing the constituent comprises a capillary tube connected to the vessel below the level of the electrolyte in the vessel.

12. In an electrolytic titration apparatus, an electrolytic cell comprising a vessel containing an electrolyte forming a reaction zone, a pair of diametrically opposed side arms containing an electrolyte, salt bridges connecting the electrolyte in the side arms to the electrolyte in the vessel, an additional side arm containing electrolyte and positioned in a plane at right angles to a plane passing through the diametrically opposed side arms, a salt bridge connecting the electrolyte in the additional side arm to the electrolyte in the vessel, generating electrodes consisting of at least one anode and at least two cathodes, the anode being disposed in the electrolyte in the vessel and the cathodes being disposed in the electrolyte in the diametrically opposed side arms, a reference electrode disposed in the electrolyte in the additional side arm and making electrolytic contact with the electrolyte in the reaction zone through the salt bridge associated with said additional side arm, a sensing electrode disposed in the electrolyte in the vessel, the anode being centrally disposed within the vessel and being in a line with the cathodes in the diametrically opposed side arms, the reference electrode and the sensing electrode being arranged in a line substantially at right angles to a line passing through the generating electrodes and the position of said sensing electrode in the electrolyte and the position at which said reference electrode makes electrolytic contact with said electrolyte in the reaction zone being in areas of approximately equal potential in the IR-drop field resulting from the current flow between said generating electrodes, and circuitry connecting the generating electrodes and the sensing and reference electrodes to cause the automatic generation of a titrant in accordance with the rate of introduction of the constituent into the electrolyte.

13. Electrolytic titration apparatus as in claim 12 together with variable resistance means connecting the sensing electrode to the titrant generating electrode for applying a signal to the sensing electrode to thereby prevent hunting as a result of over-titration.

14. Electrolytic titration apparatus as in claim 12 together with bias means for establishing null condition of the sensing electrode with respect to the reference electrode.

15. Electrolytic titration apparatus as in claim 12 wherein said generating anode is in the form of a cylinder having a slot therein, said sensing electrode being disposed in the slot in said generating anode.

References Cited in the file of this patent

UNITED STATES PATENTS

| | | |
|---|---|---|
| 2,745,804 | Shaffer | May 15, 1956 |
| 2,886,496 | Eckfeldt | May 12, 1959 |
| 2,928,774 | Leisey | Mar. 15, 1960 |